Jan. 11, 1966     E. J. CIABATTARI ETAL     3,228,526
APPARATUS FOR GASIFICATION OF LIQUIDS
Filed April 10, 1962     3 Sheets-Sheet 1
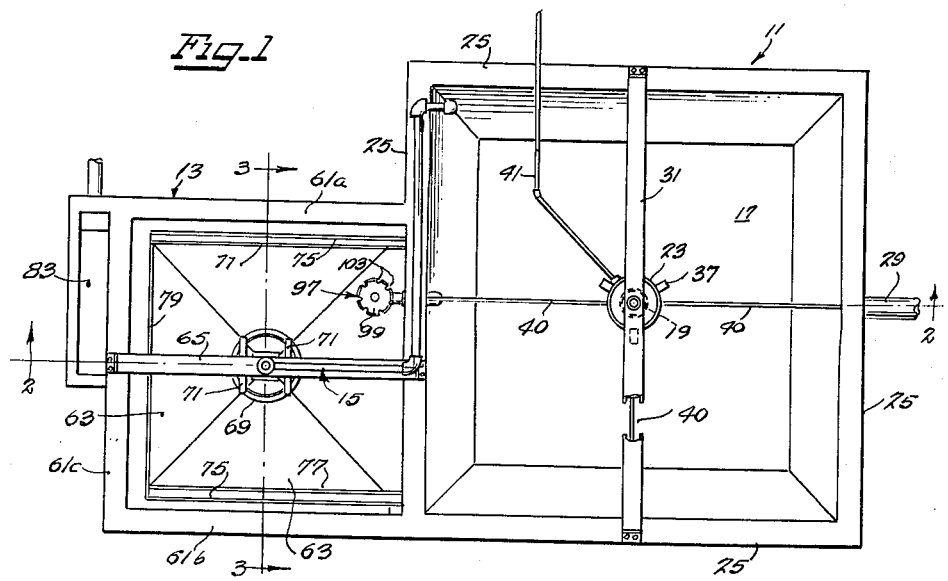
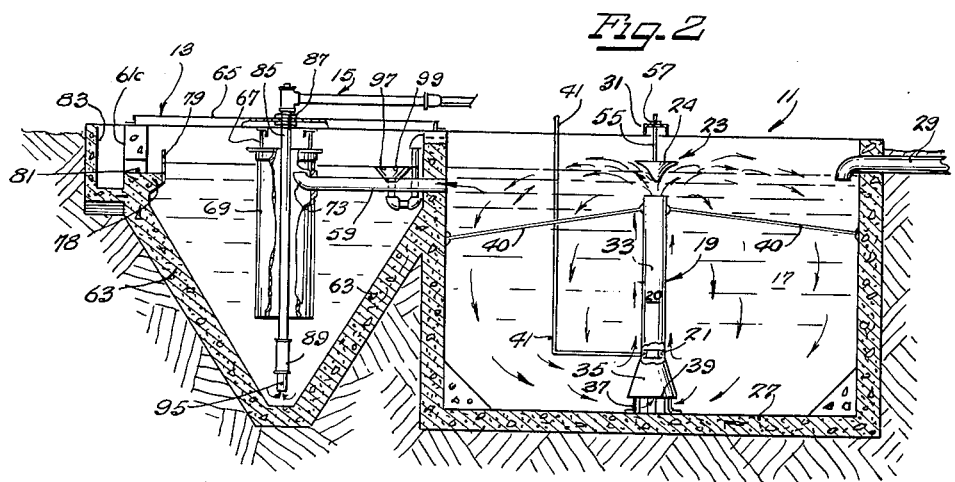
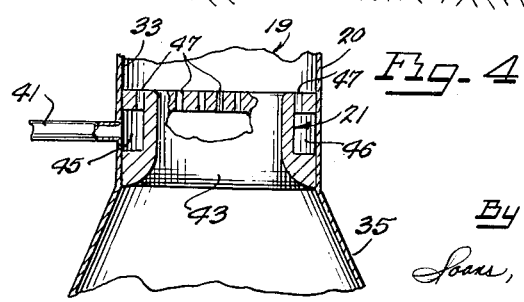
Inventors
EMIL J. CIABATTARI
LOUIS A. ELLNER
By Soans, Anderson, Luedeka & Fitch
Attys

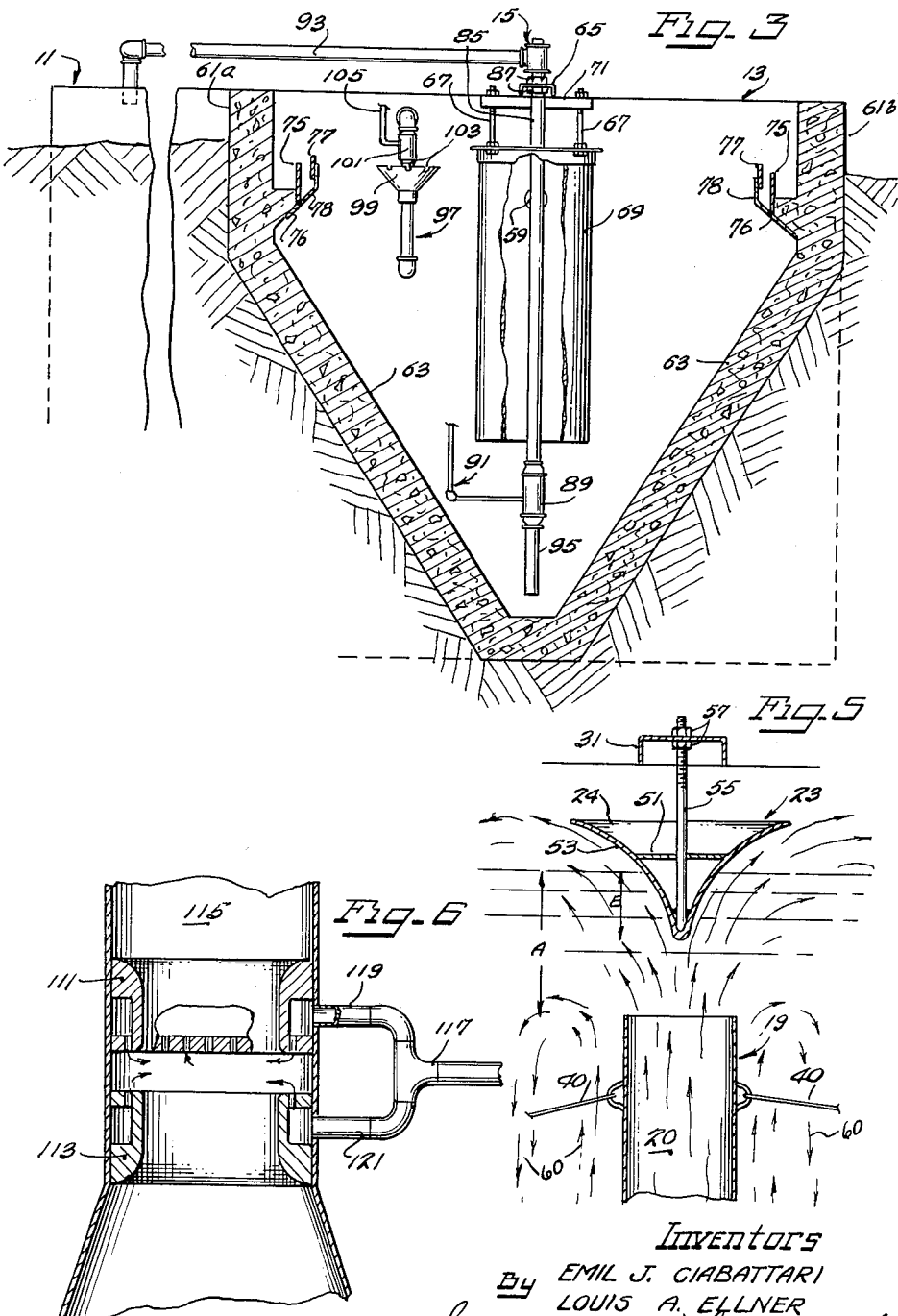

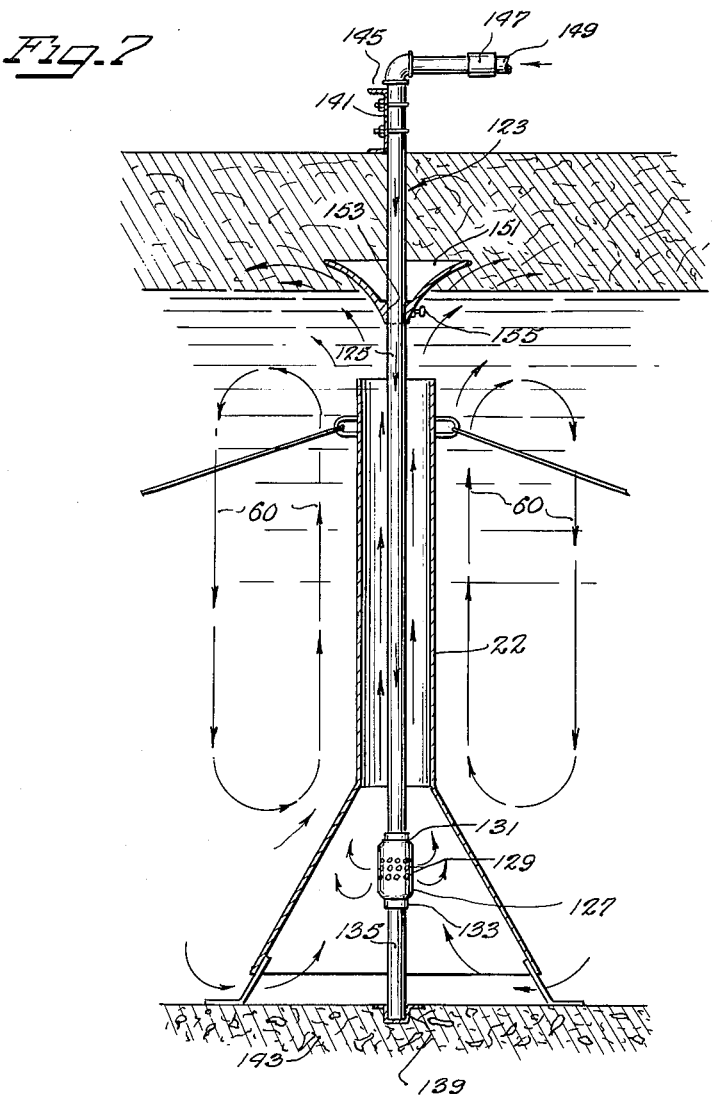

United States Patent Office 3,228,526
Patented Jan. 11, 1966

3,228,526
APPARATUS FOR GASIFICATION OF LIQUIDS
Emil J. Ciabattari, Chicago, and Louis A. Ellner, Ingleside, Ill., assignors to Yeomans Brothers Company, Melrose Park, Ill., a corporation of Delaware
Filed Apr. 10, 1962, Ser. No. 186,495
2 Claims. (Cl. 210—221)

This application is a continuation-in-part of our copending application, Serial No. 143,444, filed October 6, 1961, and now abandoned.

The present invention relates generally to gasification of liquids, and more particularly, it relates to the aeration of fluid material to effect reaction therein.

Fluid waste material, such as domestic or industrial sewage, is treated by two principal methods, the first method involving the decomposition of undesirable materials in the presence of air, and being commonly known as aerobic treatment. The second method involves the decomposition of undesirable materials in the substantial absence of air, and is known as anaerobic treatment. The present invention is particularly directed toward the aerobic treatment of fluid waste material, but has application to any fluid material which is desirably gasified.

Aerobic treatment of fluid waste material is carried out by exposing the waste material to air. Contact between air and fluid waste material can be accomplished by merely introducing air beneath the surface of the waste material. This manner of contacting has the advantage of relatively uncomplicated apparatus requirements and trouble free operation.

However, in order that rapid and efficient aeration can be obtained, it is desirable that the air so introduced be kept in contact with the material being aerated for as long as possible, and that the mixture of air and waste material be maintained in a turbulent condition. It is important that the surface of the fluid waste material be changed constantly to continuously present new interfacial contact between the atmospheric air and the waste material.

In order to accomplish this, it has been necessary either to provide mechanical agitation or to introduce the air at relatively high volumes and pressures. In this connection, the provision of supplementary mechanical agitation increases the initial apparatus cost. Mechanical agitation also requires maintenance, for stringy items or lengths of cloth often present in sewage have a tendency to become entwined about a mechanical agitator causing fouling. The introduction of air at volumes and pressures sufficient to maintain turbulence has heretofore required substantial equipment.

It is a general object of the present invention to provide improved liquid-gas contacting apparatus. A more particular object of the present invention is to provide improved means for the aerobic treatment of waste material, whereby high interfacial contact between air and fluid material is obtained without mechanical agitation. Another object is to provide improved means for the aerobic treatment of fluid material including an easily removable aeration means. A further object of the present invention is to provide improved apparatus for the surface aeration of fluid material. Other objects and advantages of the present invention will become apparent from the following description and claims, and from the drawings, in which:

FIGURE 1 is a plan view of waste treatment apparatus chosen to illustrate the principles of the present invention;

FIGURE 2 is an elevational, partially cross-sectional view, partly broken away, taken along lines 2—2 of FIGURE 1;

FIGURE 3 is an elevational, partially cross-sectional view, partly broken away, taken along lines 3—3 of FIGURE 1;

FIGURE 4 is an enlarged fragmentary view, partly broken away, of the draft tube and distributor ring which comprise a portion of the waste treatment apparatus of FIGURE 1;

FIGURE 5 is an enlarged fragmentary cross-sectional view of the draft tube and deflector which comprise a portion of the waste treatment apparatus of FIGURE 1;

FIGURE 6 is a fragmentary cross-sectional view, partly broken away, of a modified distributor ring; and FIGURE 7 is an elevational view, partly in cross section, of an alternate embodiment of an aerating means having removable features.

In general, the present invention eliminates the need for mechanical agitation in a liquid gasification apparatus by utilizing the introduction of the gas into the apparatus in a manner so as to itself create agitation and circulation throughout a tank of liquid medium. A generally vertical passageway is defined in the liquid by a draft tube 20 located near the center of the tank and having its upper end below the level of the liquid. Gas is introduced into this passageway by injector means 21. The decrease in density of the fluid in the passageway caused by the addition and mixing of the gas results in an upward liquid flow in the passageway. This upward vertical flow is directed radially across the tank surface by deflector means 23 located above the draft tube. This divergence of the liquid flow creates a primary circulation about the entire periphery of the tank (shown by the arrows in FIG. 2). At the same time, the exit of the vertically rising column of liquid from the draft tube 20, 22 at a point below the surface of the liquid, coupled with diversion caused by the deflector means, creates a secondary circulation immediately adjacent the outer surface of the draft tube, as shown by the arrows in FIGURES 2 and 7. This circulation scours the outer surface of the draft tube 20, 22 and assures agitation throughout the tank.

With reference particularly to FIGURES 1 and 2 of the drawings, it is seen that in the illustrated embodiment of the invention there is provided means 11 for aeration of fluid material, which may be associated with a settling chamber 13 in which suspended solids may be separated from aerated material by gravity and solids return means 15 for returning accumulated separated solids to the aerating means 11. The aerating means 11 comprises a reservoir 17 for containing a quantity of fluid material to be aerated, and means 19 defining a generally vertical passageway in the reservoir 17. Air is injected into the passageway below the surface of the fluid material, whereby the apparent density of the material contained in the passageway is decreased, and whereby there is established a columnar flow of a mixture of air and waste material upwardly through the passageway. The aerating means 11 further comprises deflector means 23 adjacent the upper end of the passageway, whereat the kinetic energy of the flowing column of air and waste material is effectively utilized to enhance this contact between the injected air and the waste material and to provide efficient interfacial contact between the atmosphere and the fluid waste material at the surface thereof. The deflector means 23 serves to divert the flowing column of air and waste material outwardly from the passageway, thereby providing improved aeration at the surface of the fluid waste material.

The reservoir 17 of the aerating means 11 comprises a generally rectangular open-topped tank and the generally vertical passageway 19 is defined by a draft tube 20. The aerating means 11 further includes an air injector assembly 21, and deflector means 23, which in the illustrated embodiment comprises an inverted cone 24 having a curved face.

In the illustrated embodiment, the tank 17 is constructed of concrete, and includes side walls 25 and a floor 27. An inlet conduit 29 extends through an opening provided in one of the side walls 25, through which the fluid waste material to be treated is introduced into the tank.

A bridge 31, comprising a structural steel channel, extends centrally across the top of the tank 17, and is supported upon opposite side walls 25.

The draft tube 20 is centrally disposed in the tank 17, and comprises a cylindrical upper section 33 and a frusto-conical lower section 35. The draft tube 20 is supported by support brackets 37 extending upwardly from the floor 27 of the tank 17, and is supported so that the lip 39 of the lower section 35 of the draft tube is spaced upwardly from the floor 27. Stay rods 40, which are attached to the side walls 25, provide lateral support for the draft tube 20. Thus, it will be seen that the draft tube 20 provides a vertical passageway for fluid flow therethrough from the space between the lip 39 and the floor 27 upwardly through the lower section and the upper section of the draft tube.

The air injector means 21 includes an air supply conduit 41 and a distributor ring 43. As illustrated in FIGURE 4, the distributor ring 43 comprises a toroidal casting or molding concentrically disposed within the cylindrical upper section 33 of the draft tube 20. The distributor ring 43 includes a circumferentially extending recess 45 on its periphery, and the recess 45 and the inner surface of the upper section 33 of the draft tube define an annular passageway 46 which extends around the inner circumference of the draft tube.

The distributor ring 43 further includes a plurality of gas injecting openings 47 formed therein, and in the illustrated embodiment of FIGURE 4, the openings 47 are on the upstream side of the ring 43. Each opening 47 provides a port from the annular passageway 46 to the interior of the draft tube 20.

The air supply conduit 41 extends from an external source of compressed air, such as an air compressor (not illustrated), to the distributor ring 43. As illustrated in FIGURE 4, the air supply conduit extends through a suitable opening in the draft tube 20 adjacent the distributor ring 43, and provides communication between the compressed air source and the passageway 46 of the distributor ring. Thus, compressed air may be conducted from the compressed air source through the air supply conduit 41 and the annular passageway into the waste material contained in the tank 11 through the air injecting openings 47.

As illustrated in FIGURE 5, the deflector 24 includes a support plate 51, a face plate 53, and a hanger rod 55. The hanger rod 55 is attached to the face plate 53 and the support plate 51 and extends upwardly through an opening in the bridge 31 for supported attachment thereto. The hanger rod 55 is threaded along a substantial portion of its exterior length, whereby the position of the deflector 24 is vertically adjustable by suitable adjustment of a pair of nuts 57 received by the threaded rod portion on opposite sides of the bridge 31.

The face plate 53 is generally in the shape of an inverted cone having a curved face, and is disposed so that its axis and the axis of the draft tube 20 are coaxial. It is desirable, in accordance with the present invention, that the face plate 53 be formed to have a concavely arcuate surface in order to provide a trajectory for the fluid discharged from the draft tube 20 so that the fluid is discharged along the surface of the material in the tank 17.

An outlet conduit 59 is provided, which extends through a suitable opening in one side wall 25 of the tank 17, and which conducts treated material from the tank 17 into the settling chamber 13.

In accordance with the present invention, sewage or other fluid material for gasification or aeration is introduced into the tank 17 for aeration thereof. The waste material is introduced through the inlet conduit 29, and establishes a level in the tank 17, as illustrated.

Pressurized gas is furnished to the air supply conduit 41 from a compressed gas source and conducted to the passageway 46 of the distributor ring 43. The pressure of the gas is appropriately regulated to provide a somewhat higher presure within the pasageway 46 than is present at the outlet of the ports 47 of the distributor ring 43. Consequently, there is a flow of gas from the passageway 46 into the fluid in the draft tube 20, through the air injecting openings 47.

The air flows into the sewage in the form of a stream of bubbles issuing from each of the air injecting openings 47. Air is thus introduced into the sewage within the draft tube 20 adjacent the periphery of the distributor ring, and effective dispersion of air or gas in the fluid is obtained. The air thus introduced also decreases the apparent density of the fluid and causes a columnar flow of the less dense, and hence buoyant, mixture of air and fluid upwardly through the upper section 33 of the draft tube 20. This buoyant fluid mixture is continuously replaced by more dense fluid from the lower section 35 of the draft tube 20, which fluid enters the draft tube 20 between the lip 39 of the draft tube and the floor 27 of the tank.

This mixture of air and fluid flows upwardly through the passageway 19 at a rate dependent upon the rate of introduction of air. In this connection, it is observed that, in the apparatus illustrated in in FIGURE 1, a flow through the draft tube 20 of about eight gallons of sewage per minute is obtained for every standard cubic foot of air introduced per minute.

The mixture of air and fluid continues its columnar flow upwardly past the upper end of the draft tube 20 and toward the surface of the fluid contained in the tank 17. It is then intercepted by the face plate 53 of the deflector means 23, and is diverted radially outwardly from the axis of the draft tube 20, as illustrated in FIGURE 2.

The provision of deflector means in co-operative relationship with an upwardly flowing mixture of gas and fluid is an important feature of the present invention. In this connection, the mixture acquires substantial kinetic energy as it is accelerated upwardly, and the provision of appropriate deflector means allows this mixture to be effectively spread over the surface of the fluid so as to effect desired surface contact. As illustrated in FIGURE 2, the gas and fluid mixture is diverted so as to fall outwardly from the draft tube 20 and thereby expend its energy in that portion of the liquid in which turbulence is not directly effected by the injection of the gas. As an additional result, bubbles of gas are entrained and entrapped in the mixture, and intimate and turbulent contact wtih the liquid is maintained for substantially longer periods of time.

The action of the deflector means coupled with the lower intake of the draft tube 20 near the tank bottom 27 creates a primary circulatory flow which proceeds radially outwardly from the aerating means near the liquid surface, downward generally along the sides 25 of the tank and back centrally to the aerating means near the tank bottom 27 (illustrated in FIG. 2). This circulatory flow thus keeps the entire body of liquid adjacent the periphery of the tank in agitation to facilitate air absorption by the liquid and also prevents any substantial coating of the sides 25 or bottom 27 of the tank with solids.

When apparatus constructed in accordance with the present invention is utilized in the aerobic treatment of sewage, the deflector means provides additional advantages. In this connection, aeration of sewage proceeds not only between the sewage and the injected air, but also proceeds between the surface of the sewage and the atmospheric air in contact therewith. The deflector means 23 provides an effect at the surface which results in an extended area for contact between the sewage and atmospheric air, and also promotes vigorous surface agitation, both of which further increase aeration efficiency.

The location of the upper end of the draft tube 20 below the fluid surface is also an important feature of the invention. The upward column of the liquid-gas mixture rising from the draft tube 20 has been found to have a dragging effect on the fluid adjacent the upper end of the draft tube 20. This dragging effect coupled with the lateral component of movement imparted to the column by the deflector 24 induces a secondary circulatory movement of fluid generally vertically along the outside of the draft tube 20 as indicated by arrows 60 in FIGS. 5 and 7. Of course it is important to design the upper periphery of the draft tube 20 free from any protruding apparatus which would obstruct vertical flow along the tube 20 and thereby reduce the magnitude of this secondary circulation. This induced secondary circulation is a very desirable feature, for it both scours the outside surface of the tube 20, inhibiting collection of solids thereon, and provides agitation for the fluid region in the center of the tank, which region is not necessarily affected by the primary circulatory flow described above. Thus the primary and secondary circulation, and the interaction between them, keep the entire fluid body in constant agitation aiding air absorption by the liquid and assuring that the solids therein are held in suspension.

It is observed that, to obtain the most efficient utilization of kinetic energy, the distance between the quiescent surface of the fluid and the upper end of the draft tube 20, and the distance between the quiescent surface of the fluid and the tip of the deflector plate 53 should be adjustable. In FIGURE 5, these distances are shown as "A" and "B," respectively. It has been found that it is important for efficient operation of the apparatus that the deflector 24 be at least partially submerged in the fluid. It has been observed that an adjustment of the deflector 24 to a position completely above the fluid surface results in a substantial decrease in the oxygen absorption rate from the rate achieved with the deflector 24 in a partially submerged position. An optimum distance A and an optimum distance B can be obtained for particular flow rates and treatment times. As pointed out hereinafter, the level of the fluid contained in the tank 17 may be adjusted, and the vertical disposition of the deflector 24 may be adjusted by suitable adjustment of the nuts 57 on the hanger rod 55. By means of these adjustable nuts and adjustment of the fluid level, distances A and B may be controlled to provide optimum operation.

To continue the description of the illustrated apparatus, the settling chamber 13 comprises a rectangular vessel, and, in the illustrated embodiment, is constructed of concrete. The vessel comprises three vertical side walls 61a, 61b, and 61c, and one vertical side wall which is common with an aeration tank side wall 25. The settling chamber further comprises inwardly-sloping side walls 63, which extend downwardly from the side walls 61 and 25.

The settling chamber 13 further comprises a beam 65, comprising a structural steel channel, extending centrally across the top of the chamber and supported upon side walls 25 and 61. A well 69 is suspended centrally in the chamber from the beam 65 by hanger rods 67 which are attached to transverse support members 71 fixedly attached to the beam 65. The well 69 comprises a tubular member which extends from above the surface of the fluid waste material to a point below the surface of the fluid waste material.

As shown in FIGURE 2, the outlet conduit 59 of the aerating means 11 extends through an opening in the well 69, wherein aerated waste material is discharged through an elbow 73 located on the end of the outlet conduit.

As illustrated in FIGURE 3, the settling chamber 13 further includes two weir plates 75 disposed adjacent vertical side walls 61a and 61b. The weir plates 75 are attached to shoulders 76 projecting inwardly from the side walls 61a and 61b, and are vertically adjustable thereon. Fluid material from the settling chamber 13 overflows the weir plates 75, and the level of the waste material within the settling chamber is thereby determined. Since the tank 17 of the aerating means 11 is in fluid communication with the settling chamber 13 through the conduit 59, the level of the waste material in the tank 17 is also determined thereby.

Baffle plates 77 are provided inwardly of and generally parallel to each of the weir plates 75 on side walls 61a and 61b, and, as illustrated in FIGURE 3, are supported at the surface of the fluid waste material by brackets 78. The baffle plates 77 serve to retain surface material within the settling chamber 13 by preventing its passage over the weir plates 75.

A dam 79, comprising an elongated steel plate, is disposed parallel to side wall 61c of the settling chamber 13 (FIGURE 2). The dam is suitably attached to a shoulder 78 projecting inwardly from the side wall 61c.

It will be seen that the side walls 61a, 61b, and 61c, the shoulders 76, and the weir plates 75 and the dam 79 define three gutters parallel to each of the side walls 61a, 61b, and 61c. These gutters serve to collect the waste material which overflows the weir plates 75, and to conduct it to a passageway 81 in the side wall 61c adjacent the dam 79. The waste material then flows into a sump 83, from whence it is conducted to suitable disposal means (not illustrated).

The solids return assembly 15 provides for the return of settled solids in the settling chamber 13 to the aerating means 11. As particularly illustrated in FIGURE 3, the solids return assembly 15 includes a vertically disposed conduit 85, which conduit extends through a suitable opening in the beam 65. The conduit 85 is supported from the beam by appropriate collars 87, and extends downwardly into the settling chamber 13. There is provided an air-operated pump 89 at the lower end of the conduit 85. The pump 89 comprises a Venturi-type ejector pump, and compressed air is supplied to the pump from an external source (not illustrated) through associated piping 91. A common source of compressed air may be employed for the pump 89 and the aerating means 11.

The solids return assembly 15 further comprises appropriate pipe and fittings, indicated generally by the numeral 93, whereby accumulated solids are conducted into the tank 17 of the aerating means 11. A nipple 95 is provided at the inlet of the air-operated pump 89, which nipple extends to a point adjacent the bottom of the settling chamber 13.

There is also provided a scum return assembly 97, which is operative to skim floating material from the surface of the fluid material contained in the settling chamber 13, and to return such material to the tank 17 of the aerating means 11. As illustrated in FIGURE 3, the scum return assembly 97 includes a collector cone 99, and an air-operated pump 101. The collector cone 99 is disposed in the settling chamber 13 at a level adjacent the surface of the fluid material contained in the chamber. Notches 103 are provided in the rim of the cone 99 to facilitate passage of the fluid material over the rim of the cone 99.

The collector cone 99 is in fluid communication with the air-operated pump 101, whereby fluid waste material collected in the cone is returnable to the aerating means 11. The pump 101 is similar to the above-described air-operated pump 89 of the solids return assembly 15, and air is supplied to the pump 101 by appropriate piping 105.

The operation of the illustrated apparatus will now be described. In this connection, fluid material which has been aerated in the aerating means 11 is conducted into the settling chamber 13 through the outlet conduit 59 and elbow 73. It will be seen that the aerated fluid is discharged into the interior of the well 69, and the well 69 directs the material downwardly toward the bottom of the settling chamber 13.

The level of the fluid material in the settling chamber 13 is established by the top of the weir plates 75, and the level of the fluid material in the tank 17 of the aerating means 11 is also established by this means.

In the settling chamber 13, solids having relatively high density settle from the fluid material and are deposited in the lower portion of the settling chamber. Solids having relatively low density float to the surface of the fluid waste material, and are retained thereat by the baffle plates 77. The liquid which overflows the weir plates 75 is substantially free from suspended material, and the biological oxygen demand of the liquid is relatively low.

Solids which accumulate in the bottom portion of the settling chamber 13 are periodically returned to the aerating means 11 by the solids return assembly 15. In this connection, the solids are returned by admitting compressed air to the pump 89, and allowing the pump to operate until the accumulated solids are removed. Similarly, scum is returned to the aeration means 11 by periodically admitting air to the pump 101 of the scum return assembly 97, and allowing the pump to operate for a short period. It will be understood that the frequency at which the solids return assembly 15 and the scum return assembly 97 are operated will depend upon the particular properties of the fluid material which is being treated, and upon the rate of flow of fluid material.

As an example of the practice of the present invention, apparatus of the type hereinbefore described was utilized in the treatment of sewage from an industrial plant. The sewage had a biological oxygen demand of about 330 p.p.m. The tank 17 of the aerating means 11 was selected for an average sewage output of 6250 pounds per hour, and had a liquid capacity of 150,000 pounds, thereby providing an average retention time in the tank of about 24 hours. The tank was 16 feet by 16 feet by 8 feet deep, thereby providing about 256 square feet available to the atmosphere.

Air was injected into the draft tube at a rate of 160 cubic feet per minute, and about 2.38 kw. of electrical energy was required to provide the compressed air. The liquid level in this tank was held at 7 feet.

The draft tube 20 utilized was 66 inches in length and was positioned 6 inches from the tank bottom. The diameter of the cylindrical portion 33 of the draft tube measured 20 inches. A deflector 24 was used which was 12 inches in height and had a maximum diameter of 32 inches. The deflector 24 was positioned so that the distances shown in FIGURE 5 were: "A"—12 inches and "B"—6 inches.

The rate of absorption of oxygen in the sewage for this apparatus was about 5.3 pounds per hour, and this corresponded to a power requirement of 0.45 kw.-hr. per pound of absorbed oxygen.

The settling chamber had a liquid capacity of about 26,000 pounds, which provided an average retention time in the settling chamber of about 4 hours. The settled solids and scum were periodically returned to the tank of the aeration chamber as necessary.

Various modifications will be apparent from the foregoing description. One modification, which is illustrated in FIGURE 6, comprises the use of dual-distributor rings 111 and 113 in a draft tube 115. An air supply conduit 117 having dual inlet nipples 119 and 121 connects to the rings 111 and 113. The rings 111 and 113 are mirror images of each other and are generally similar to the ring 43, previously described. The use of two or more distributor rings may be advantageous under particular conditions to provide additional capacity.

Another modification, illustrated in FIGURE 7, relates to the use of a removable air manifold unit 123. The unit 123 comprises a central air header or feeder pipe 125 and a generally ovoid air distributor 127. This hollow air distributor 127 has a plurality of air outlet ports 129 spaced about its outer surface and has upper and lower threaded openings 131, 133. The upper threaded opening 131 allows the air distributor 127 to be screwed onto cooperating threads provided on the lower end of the header 125 so that the header 125 is in communication with the outlet ports 129. The lower opening 133 receives a supporting post 135.

The removable air manifold unit 123 is positioned centrally in a draft tube 22 by means of a positioning element 139 proportioned to receive the supporting post 135 and by an upper bracket 141 which attaches to the upper portion of the header 125. The positioning element 139 is suitably secured to the tank floor 143, and the bracket 141 is appropriately attached to a bridge 145 extending across the top of the tank. The central header 125 is connected, above the bracket 141, by a detachable coupling 147 to an air supply conduit 149. In this embodiment, the deflector 151 is provided with a central cylindrical passageway 153 and one or more set screws 155 positioned radially to the passageway 153. The passageway 153 is proportioned to fit about the outer surface of the header 125 which is used to support the deflector 151 in its operating position. The set screw arrangement allows the deflector 151 to be easily adjusted to different vertical positions along the header 125. Thus the modification provides a removable air unit 123 which can be easily lifted from the draft tube 22 after disconnecting the coupling 147 and the bracket 141.

Thus, there has been provided improved liquid-gas contacting apparatus, and, in particular, there is provided improved apparatus for the surface aeration for fluid waste material. Apparatus constructed in accordance with the present invention is particularly advantageous in that there are no moving parts below the fluid level so that maintenance problems are minimized.

Various of the features of the present invention are set forth in the following claims.

What is claimed is:

1. Surface aeration apparatus comprising, in combination, a tank for holding a quantity of fluid material, means including inlet and outlet means maintaining the upper fluid surface in said tank at a preselected level, an elongated draft tube located in said tank which draft tube extends vertically from a position adjacent to, but spaced above, the bottom of said tank to a position adjacent to, but submerged below, said preselected level of the fluid in said tank, said draft tube including a generally cylindrical upper section and a truncated conical lower section having its reduced end joined to said upper section, the base of said truncated lower section being substantially larger than the diameter of said upper cylindrical section of said draft tube and being spaced a substantial distance vertically from the lower end of said upper cylindrical section of said draft tube, the outer surface of the upper end portion of said draft tube cylindrical section being straight and substantially free of obstructions to allow fluid flow upwardly therealong, deflector means generally in the shape of a cone located in coaxial relation with said draft tube with the apex of said deflector means submerged below said preselected level of fluid but positioned above the upper end of said draft tube and with the base end portion of said deflector means being disposed above said preselected level of fluid, and means for injecting sufficient air under pressure into said draft tube to establish a flow of fluid upwardly through said draft tube with sufficient kinetic energy to contact said deflector means and be diverted laterally and upwardly past said fluid surface level and fall onto the surface of fluid in said tank outside said draft tube, whereby fluid which is drawn in at the bottom of said draft tube and discharged against the surface of said deflector means effects vertical circulation within the tank, and whereby the discharge of fluid from the submerged unobstructed upper end of said draft tube induces upward movement of fluid along the outer surface of said draft tube, and whereby the outer surface of the upper end portion of said draft tube cylindrical section is continuously scoured and kept clean by the upward movement of fluid.

2. Surface aeration apparatus comprising, in combination, a tank for holding a quantity of fluid material, means including inlet and outlet means maintaining the upper fluid surface in said tank at a preselected level, an elongated draft tube located in said tank which draft tube extends vertically from a position adjacent to, but spaced above, the bottom of said tank to a position adjacent to, but submerged below, said preselected level of the fluid in said tank, said draft tube including a generally cylindrical upper section and a truncated conical lower section having its reduced end joined to said upper section, the base of said truncated lower section being substantially larger than the diameter of said upper cylindrical section of said draft tube and being spaced a substantial distance vertically from the lower end of said upper cylindrical section of said draft tube, the outer surface of the upper end portion of said draft tube cylindrical section being straight and substantially free of obstructions to allow fluid flow upwardly therealong, pipe means extending centrally downward into said draft tube for injecting air thereinto at a location within said truncated conical lower section, deflector means having generally the shape of an inverted cone adjustably mounted on said pipe means and disposed with the base end of said cone above said preselected surface level and with the apex thereof submerged below said preselected surface level to a depth about one-half the distance between said preselected surface level and the upper end of said draft tube, and means for supplying sufficient air under pressure to said pipe means to establish a flow of fluid upwardly through said draft tube with sufficient kinetic energy to contact said deflector means and be diverted laterally and upwardly past said fluid surface level and fall onto the surface of fluid in said tank outside said draft tube, whereby fluid which is drawn in at the bottom of said draft tube and discharged against the surface of said deflector means effects vertical circulation within the tank, and whereby the discharge of fluid from the submerged unobstructed upper end of said draft tube induces upward movement of fluid along the outer surface of said draft tube, and whereby the outer surface of the upper end portion of said draft tube cylindrical section is continuously scoured and kept clean by the upward movement of fluid.

References Cited by the Examiner
UNITED STATES PATENTS

| | | | |
|---|---|---|---|
| 1,414,209 | 4/1922 | Rogers et al. | 261—124 |
| 1,644,214 | 10/1927 | Westling | 261—121 |
| 1,744,785 | 1/1930 | McTaggart | 261—121 |
| 1,867,512 | 7/1932 | Kusch | 210—220 X |
| 1,867,824 | 7/1932 | Hammerly | 210—220 X |
| 2,077,907 | 4/1937 | Streander | 210—197 X |
| 2,090,384 | 8/1937 | Durdin | 210—197 |
| 2,246,224 | 6/1941 | Streander | 210—221 X |
| 2,638,444 | 5/1953 | Kappe | 210—220 X |
| 2,651,615 | 9/1953 | Kelly et al. | 210—525 X |
| 2,802,647 | 8/1957 | Bolton | 210—197 X |
| 2,987,186 | 6/1961 | Burgoon et al. | 210—220 X |
| 3,043,433 | 7/1962 | Singer | 261—123 X |
| 3,055,502 | 9/1962 | Cunetta | 210—197 |
| 3,092,678 | 6/1963 | Braun | 210—221 X |

REUBEN FRIEDMAN, *Primary Examiner.*

GEORGE D. MITCHELL, ROBERT F. BURNETTE, *Examiners.*